United States Patent Office 3,491,105
Patented Jan. 20, 1970

3,491,105
**1-NITROPHENYL AND 1-NITROPYRIDYL-
NITROIMIDAZOLES**
Rainer Klink and Ludwig Hepding, Darmstadt, Germany,
assignors to E. Merck A.G., Darmstadt, Germany
No Drawing. Filed Sept. 25, 1967, Ser. No. 670,414
Claims priority, application Germany, Oct. 15, 1966,
M 71,291; Mar. 1, 1967, M 72,966
Int. Cl. C07d *49/36;* A01n *9/22*
U.S. Cl. 260—296   19 Claims

ABSTRACT OF THE DISCLOSURE

Compounds effective against trichomonads, amoebae and trypanosomes, and being of the formula:

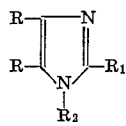

wherein:
$R_1$ is H or $CH_3$;
$R_2$ represents a phenyl residue or pyridyl residue, said residue being substituted by 1 or 2 nitro groups, and being optionally substituted by 1 or 2 lower alkyl groups; and one R represents nitro, and the other R represents hydrogen.

---

Applicants hereby claim the benfit of the filing dates of German patent applications M 71,291 of Oct. 15, 1966, and M 72,966 of Mar. 1, 1967, pursuant to the provisions of 35 U.S.C. 119.

This invention relates to nitro-substituted imidazole derivatives suitable for treating infections caused by certain microorganisms.

For combatting diseases caused by trichomonads and amoebae, there is a commercial product 1-(2'-hydroxyethyl)-2-methyl-5-nitroimidazole having the trademark Clont, but this compound is not effective against disease-causing trypanosomes.

An object of this invention is to provide chemical compounds which are effective against trypanosomes as well as other disease-causing microorganisms.

Other objects include methods of preparing such chemical compounds and providing novel intermediates therefor.

Still other objects include pharmaceutical and antiseptic preparations, as well as processes for combatting disease based on the compounds of this invention.

Upon further study of the specification and claims, other objects and advantages of the present invention will become apparent.

To attain the objects of this invention, there are provided compounds of Formula I, as follows:

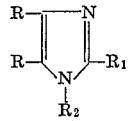   I wherein:
$R_1$ is H or $CH_3$;
$R_2$ represents a phenyl residue or pyridyl residue, said residue being substituted by 1 or 2 nitro groups, and being optionally substituted by 1 or 2 lower alkyl groups; and
one R represents a nitro group, and the other R represents hydrogen.

These compounds are effective, in vitro and in vivo, against disease-causing trichomonads, amoebae, and trypanosomes. In particular, the effect covers *Trichomonas vaginalis, Trichomonas fetus, Entamoeba histolytic, Trypanosoma congolense, Trypanosoma equinum, Trypanosoma equiperdum,* and *Trypanosoma evansi.*

On oral application to mammals, the substances exhibited a particularly efficacious therapeutic effect in trichomonal and amoeba infections (peritonitis caused by *Trichomonas fetus,* abscess caused by *Trichomonas vaginalis,* hepatic abscess caused by amoebae, and intestinal amoebiasis). The experiments extended to mice, rats, and golden hamsters (*Mesocricetus auratus*).

Particularly effective proved to be 1-(4-nitrophenyl)-2-methyl-4- and -5-nitroimidazole, as well as 1-(5-nitro-2-pyridyl)-4- and -5-nitromidazole.

Aside from being employed as pharmaceuticals, the compounds of Formula I can also be used as intermediates for the preparation of further pharmaceuticals.

To produce the novel compounds of Formula I, alternative processes can be employed as follows:

(A) A metallic derivative, preferably an alkali metal derivative, of a 4(5)-nitroimidazole of Formula II. (Although the following Formula II indicates that the nitro group is in the 4-position, it is actually a tautomer in equilibrium with the 5-nitroimidazole and the designation 4(5) is used to convey the fact).

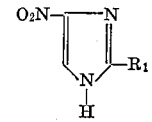   II wherein $R_1$ has the previously indicated meaning is reacted with a halogenide of the formula $R_2X$ (wherein X represents halogen); or (B) A compound of Formula III

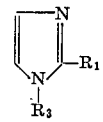   III wherein:
$R_1$ has the previously indicated meaning; and
$R_3$ represents a phenyl or pyridyl residue which is optionally substituted by 1 or 2 nitro groups and/or 1 or 2 lower alkyl groups, is nitrated in an acidic medium.

$R_2$ preferably represents phenyl substituted in the 2- or 4-position by at least one nitro group, or 2-pyridyl substituted in the 3- and/or 5-position by one or two nitro groups, and in particular o- or p-nitrophenyl, 2,4-dinitrophenyl, 2-methyl-4-nitrophenyl, 3-methyl-4-nitrophenyl, 3-nitro-2-pyridyl, 5-nitro-2-pyridyl, and 3,5-dinitro-2-pyridyl, furthermore m-nitrophenyl, 4-methyl-2-nitrophenyl, 2 - ethyl - 4-nitrophenyl, 4 - ethyl-2-nitro-phenyl, 2,3-dimethyl - 4-nitrophenyl, 2,5-dimethyl - 4-nitrophenyl, 4-nitro-2-pyridyl, 6 - nitro-2-pyridyl, 3-methyl - 5-nitro-2-pyridyl, 4-methyl - 5-nitro-2-pyridyl, 3-nitro-4-pyridyl.

$R_3$ has preferably the same meaning as $R_2$; however, it can also be, for example, phenyl, 2-pyridyl, o-, m-, or p-tolyl.

Preferred halogenides of the formula $R_2X$ are the fluorine and chlorine compounds. Typical halogenides $R_2X$ are o-, m-, and p-nitrofluorobenzene, o-, m- and p-nitrochlorobenzene, o- and p-nitrobromobenzene, o- and p-nitroiodobenzene, 2,4-dinitrofluoro-, -chloro-, and bromobenzene, 2-fluoro- and 2-chloro-5-nitrotoluene, 2-nitro-5-fluoro- and -5-chlorotoluene, 2-fluoro- and 2-chloro-5-nitroethylbenzene, 2-nitro-5-fluoro- and -5- chloroethylbenzene, 2-chloro-5 - nitro - 1,4 - xylene, 3-chloro-6-nitro-1,2-xylene, 2-fluoro-3-, -4-, -5- and -6-nitropyridine, 2-chloro-3-, -4-, -5- and -6-nitropyridine, 2-fluoro-3- and -4-methyl-5-nitropyridine, 2-chloro-3- and -4-methyl-5-nitropyridine, and 2-fluoro- and 2-chloro-3,5-dinitropyridine.

Metallic derivatives of the compounds of Formula II are mainly the alkali metal derivatives, particularly the sodium, potassium and lithium derivatives. Also, suitable are the Grignard derivatives (Formula II, MgCl, MgBr, or MgI in place of H).

The reaction according to this process is normally conducted by first producing the corresponding metal derivative from the 4(5)-nitroimidazole. This can be done, for example, by dissolving the compound of Formula II in alcoholic alcoholate solutions (e.g., sodium or potassium methylate in methanol, sodium or potassium ethylate in ethanol), or by mixing the nitroimidazole with aqueous alkali solution and isolating the solid salt.

The reaction of the metal derivative with the halogenide of the formula $R_2X$ is suitably conducted in a solvent or solvent mixture wherein both reactants are soluble, e.g., methanol, ethanol, acetone, dimethyl formamide, tetrahydrothiophene dioxide, at room temperature or under heating. The reaction conditions depend essentially upon the reactivity of the halogen atom X. If this halogen atom is very reactive (for example in 2,4-dinitrochlorobenzene or 2-chloro-5-nitropyridine), then a brief heating of the reaction solution is sufficient to conduct the reaction. In case of less reactive halogen compounds (e.g., nitrochlorobenzene), longer heating to higher temperatures, with pressure, if necessary, is suitable. In general, reaction temperatures between room temperature and 200° C. and reaction times between a few minutes and 24 hours are employed for conducting the reaction.

The working-up process is normally conducted without difficulties. The desired products are obtained by pouring the reaction mixture into water, filtering, and then purifying by recrystallization with the optional use of activated charcoal.

Examples of imidazoles of Formula III include, but are not limited to: 1-phenyl-, 1-phenyl-2-methyl-, 1-(o-tolyl)-, 1-(o-tolyl)-2-methyl-, 1-(m-tolyl)-, 1- (m-tolyl)-2-methyl-, 1-(p-tolyl)-, 1-(p-tolyl)-2-methyl-, 1-(2-pyridyl)-, 1-(2-pyridyl)-2-methyl, 1-(4-pyridyl)-, 1-(4-pyridyl)-2-methyl-, 1-(o-nitro-phenyl)-, 1 - (o - nitrophenyl)-2-methyl-, 1-(p-nitrophenyl) - , 1-(p - nitrophenyl)-2-methyl-, 1-(2,4-dinitrophenyl)-, 1-(2,4-dinitrophenyl)- 2-methyl-, 1-(2-methyl-4 - nitrophenyl)-, 1 - (2-methyl-4-nitrophenyl)-2-methyl-, 1-(3-methyl-4 - nitrophenyl)-, 1-(3-methyl-4-nitrophenyl) - 2 - methyl-, 1 - (3-nitro-2-pyridyl)-, 1-(3-nitro-2-pyridyl)-2-methyl-, 1-(5-nitro-2-pyridyl)-, and 1-(5-nitro-2 pyridyl)-2-methyl-imidazole.

The nitration of the imidazole derivatives of Formula III is conventionally conducted with nitrating agents at reaction temperatures between about −20 and 150° C., preferably between 0 and 130° C. Preferred nitrating agents are nitric acid and the derivatives thereof, for example, the metal salts thereof, acyl nitrates, and dinitrogen pentoxide.

The nitration is conducted, for example, with 100% nitric acid, at temperatures between about 0 and about 100° C., it being possible to add, in addition, inert solvents, such as acetic anhydride, glacial acetic acid, or mixtures of the same. It is also possible to conduct the reaction with dilute nitric acid of about 50 to 100%, for example 65%, or with metal nitrates, preferably potassium or sodium nitrate, if the reaction is conducted in concentrated or fuming sulfuric acid. The reaction temperatures for these latter modes of operation are preferably 80–120° C. and 0–130° C., respectively.

Suitable acyl nitrates are, for example, acetyl or benzoyl nitrate which are employed at temperatures between about 0 and 50° C. Dinitrogen pentoxide is employed in inert, non-nitratable solvents, e.g., carbon tetrachloride, the temperatures being likewise between about 0 and 50° C.

If the starting compound III does not contain a nitro group, then there are introduced, by the process of this invention, beside the nitro group in the 4- or 5-position of the imidazole ring, one (or two) further nitro group(s) on the phenyl or pyridyl ring.

In the nitration of the compounds of Formula III, there are normally obtained the 4-, as well as the 5-nitroimidazole derivative. The working-up and separation of the isomers generally does not present any difficulties as such and can be conducted by crystallization and/or chromatography. In order to separate the isomers, it is also possible to make use of the differing basicities of the 4- and 5-nitroimidazole derivatives; for example, the 1-(4-nitrophenyl)-2-methyl-4-nitroimidazole is almost insoluble, at room temperature, in 20% sulfuric acid, but the corresponding 5-nitroimidazole derivative is soluble.

The starting substances of Formulae II, III and $R_2X$ are either known, or they can easily be prepared analogously to conventional compounds.

The preferred subgeneric groups of compounds of this invention are, with reference to Formula I (wherein $R_1$ and $R_2$ are as previously set forth unless otherwise indicated), as follows:

(A) Compounds of Formula I wherein the R nitro group is in the 4-position.

(B) Compounds of Formula I wherein the R nitro group is in the 5-position.

(C) Compounds of Formula I wherein the R nitro group is in the 4-position, and $R_2$ represents

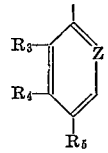

$R_3$ is H, $CH_3$, or $NO_2$;
$R_4$ is H or $CH_3$;
$R_5$ is H or $NO_2$; and
Z is CH or N, with the provision that at least one of the residues $R_3$ and $R_5$ is $NO_2$.

(D) Compounds as defined by group (C) except the R nitro group is in the 5-position.

(E) Compounds of Formula I wherein the R nitro group is in the 4-position, and $R_2$ represents p-nitrophenyl.

(F) Compounds of Formula I wherein the R nitro group is in the 5-position, and $R_2$ represents p-nitrophenyl.

(G) Compounds of Formula I wherein the R nitro group is in the 4-position, and $R_2$ represents 5-nitro-2-pyridyl.

(H) Compounds of Formula I wherein the R nitro group is in the 5-position, and $R_2$ represents 5-nitro-2-pyridyl. The following specific 4-nitro-imidazoles as well as the corresponding isomeric 5-nitro-imidazoles are particularly preferred:

1-(2-nitrophenyl)-
1-(2-nitrophenyl)-2-methyl-
1-(3-nitrophenyl)-
1-(3-nitrophenyl)-2-methyl-
1-(4-nitrophenyl)-
1-(4-nitrophenyl)-2-methyl-
1-(2,4-dinitrophenyl)-
1-(2,4-dinitrophenyl)-2-methyl-
1-(2-methyl-4-nitrophenyl)-
1-(2-methyl-4-nitrophenyl)-2-methyl-
1-(3-methyl-4-nitrophenyl)-
1-(3-methyl-4-nitrophenyl)-2-methyl-
1-(4-methyl-2-nitrophenyl)-
1-(4-methyl-2-nitrophenyl)-2-methyl-
1-(2-ethyl-4-nitrophenyl)-

1-(2-ethyl-4-nitrophenyl)-2-methyl-
1-(4-ethyl-2-nitrophenyl)-
1-(4-ethyl-2-nitrophenyl)-2-methyl-
1-(2,3-dimethyl-4-nitrophenyl)-
1-(2,3-dimethyl-4-nitrophenyl)-2-methyl-
1-(2,5-dimethyl-4-nitrophenyl)-
1-(2,5-dimethyl-4-nitrophenyl)-2-methyl-
1-(3-nitro-2-pyridyl)-
1-(3-nitro-2-pyridyl)-2-methyl-
1-(4-nitro-2-pyridyl)-
1-(4-nitro-2-pyridyl)-2-methyl-
1-(5-nitro-2-pyridyl)-
1-(5-nitro-2-pyridyl)-2-methyl-
1-(6-nitro-2-pyridyl)-
1-(6-nitro-2-pyridyl)-2-methyl-
1-(3,5-dinitro-2-pyridyl)-
1-(3,5-dinitro-2-pyridyl)-2-methyl-
1-(3-methyl-5-nitro-2-pyridyl)-
1-(3-methyl-5-nitro-2-pyridyl)-2-methyl-
1-(4-methyl-6-nitro-2-pyridyl)-
1-(4-methyl-5-nitro-2-pyridyl)-2-methyl-
1-(3-nitro-4-pyridyl)- and
1-(3-nitro-4-pyridyl)-2-methyl-.

The novel compounds of this invention can be employed in mixture with conventional pharmaceutical excipients. Carrier substances can be such organic or inorganic substances suitable for parenteral, enteral, or topical application, and which, of course, do not deleteriously react with the novel compounds, such as, for example, water, vegetable oils, polyethylene glycols, gelatin, lactose, amylose, magnesium stearate, talc, Vaseline, cholesterol, etc.

For parenteral application, particularly suitable are solutions, preferably oily or aqueous solutions, as well as suspensions, emulsions, or implants. Ampoules are convenient unit dosages.

For enteral application, particularly suitable are tablets or dragees which are also characterized by talc and/or a carbohydrate carrier or binder or the like, the carbohydrate carrier being preferably lactose and/or corn starch and/or potato starch. A syrup or the like can also be used wherein a sweetened vehicle is employed.

For topical application, viscous to semi-solid forms are used such as liniments, salves, or creams, which are, if desired, sterilized, or mixed with auxiliary agents, such as preservatives, stabilizers, or wetting agents, or salts for influencing the osmotic pressure, or with buffer substances.

The novel compounds are used in effective amounts being preferably administered to mammals in unit dosages of between 10 and 1000 mg., the mg./kg. ratio being preferably 0.1 to 20. Generally the amount of carrier per unit dosage is 1–5000 mg.

In general the techniques of using the compounds of this invention are the same as those employed with "Clont."

In addition to the use of these compounds for administration to mammals, they can be employed in admixture with carriers, germicides, fungicides or soaps, etc. for use as antiseptic solutions and the like, particularly in conjunction with hospital housekeeping procedures.

Without further elaboration, it is believed that one skilled in the art can, using the procedure description, utilize the present invention to its fullest extent. The following preferred specific embodiments are, therefore, to be construed as merely illustrative, and not limitative of the remainder of the specification and claims in any way whatsoever.

EXAMPLE 1

In 100 ml. ethanol, 2.3 g. sodium are dissolved; 11.3 g. 4(5)-nitroimidazole and 17 g. 2-chloro-5-nitropyridine are added, and the reaction mixture refluxed for 15 minutes. Thereafter, the mixture is poured into water, the precipitated crystals are filtered off, dissolved in acetone, filtered over charcoal, and the filtrate mixed with petroleum ether until clouding occurs. There are obtained 19 g. 1-(5-nitro-2-pyridyl)-4-nitroimidazole, M.P. 196–198° C.

Analogously, the following compounds are obtainable:

with 2-chloro-3-nitropyridine:
   1-(3-nitro-2-pyridyl)-4-nitroimidazole, M.P. 144–146° C.; and with 2-chloro-3,5-dinitropyridine:
   1-(3,5-dinitro - 2 - pyridyl)-4-nitroimidazole, M.P. 146–149° C.

EXAMPLE 2

15 g. solid sodium salt of 2-methyl-4(5)-nitroimidazole are dissolved in 100 ml. propanol. There are added 15.7 g. p-nitrochlorobenzene, and the mixture is heated for 30 minutes to 150° C. in a bomb tube. After cooling, the reaction mixture is introduced into water, the precipitated crystals are separated, and after recrystallization from acetone, there are obtained 18.5 g. 1-(4-nitrophenyl)-2-methyl-4-nitroimidazole.

EXAMPLE 3

A solution of 15 g. sodium salt of 2-methyl-4(5)-nitroimidazole and 14.1 g. p-nitrofluorobenzene in 100 ml. dimethyl formamide is boiled for 15 minutes. Subsequently, the larger portion of the solvent is removed under reduced pressure, water is added, the reaction mixture filtered, and the precipitate recrystallized from acetone. There are obtained 15 g. 1-(4-nitrophenyl)-2-methyl-4-nitroimidazole, M.P. 185–187° C.

Analogously, the following compounds are obtained:

with the sodium salt of 4(5)-nitroimidazole:
   1-(4-nitrophenyl) - 4 - nitroimidazole, M.P. 188–190° C.;

with o-nitrofluorobenzene:
   1-(2-nitrophenyl)-4-nitroimidazole (M.P. 123–125° C.) and 1-(2-nitrophenyl)-2-methyl-4-nitroimidazole, M.P. 177–179° C.;

with 2,4-dinitrochlorobenzene:
   1-(2,4-dinitrophenyl)-4-nitroimidazole (M.P. 154–156° C.) and 1-(2,4-dinitrophenyl)-2-methyl-4-nitroimidazole, M.P. 194–196° C.;

with 2-fluoro-5-nitrotoluene:
   1-(2-methyl-4-nitrophenyl)-4-nitroimidazole (M.P. 185–187° C.) and 1-(2-methyl-4-nitrophenyl)-2-methyl-4-nitroimidazole, M.P. 196–197° C.;

with 2-nitro-5-fluorotoluene:
   1-(3-methyl-4-nitrophenyl)-2-methyl - 4 - nitroimidazole, M.P. 176–178° C.;

with 2-chloro-5-nitropyridine:
   1-(5-nitro-2-pyridyl)-2-methyl - 4 - nitroimidazole, M.P. 175–178° C.;

with 2-chloro-3-nitropyridine:
   1-(3-nitro-2-pyridyl)-2-methyl - 4 - nitroimidazole, M.P. 179–182° C.; and with 2-chloro-3,5-dinitropyridine:
   1-(3,5-dinitro-2-pyridyl)-2-methyl - 4 - nitroimidazole, M.P. 150–152° C.

EXAMPLE 4

In 200 ml. 65% nitric acid, 101.5 g. 1-(4-nitrophenyl)-2-methyl-imidazole (M.P. 134–135° C., obtained by two hours of stirring 2-methyl-imidazole with 4-nitrofluorobenzene in dimethyl formamide at 120–125° C.) are dissolved; 50 ml. concentrated sulfuric acid are added, and the mixture is heated to 120° C. The mixture is maintained at this temperature for one hour and, during this time, there are added in batches an additional 150 ml. concentrated sulfuric acid. Within one further hour, the reaction mixture is allowed to cool to 50° C. and is then poured on 800 g. of ice. During this procedure, the crude yellow 1-(4-nitrophenyl)-2-methyl - 4 - nitroimidazole is separated; this crude product is purified by recrystallization from acetone and chromatography on silica gel with ethyl acetate as the elution agent. There are obtained 5.1 g., M.P. 185–186° C.

The aqueous filtrate is diluted with 500 ml. water and mixed with sodium hydroxide solution until an alkaline reaction sets in. A precipitate separates which is vacuum-filtered and then made into a slurry twice with 200 ml. portions of 0.5 N sulfuric acid. Another vacuum-filtering step is conducted, obtaining product (A), the precipitate is boiled with 400 ml. 2 N sulfuric acid, filtered in the hot state, and the filtrate is cooled. Crystalline 1-(4-nitrophenyl)-2-methyl-5-nitroimidazole is separated. By making the filtrate alkaline, a second fraction can be obtained. The product is recrystallized from ethanol and chromatographed on silica gel with ethyl acetate as the elution agent. There are obtained 16 g. of final product, M.P. 164.5–165.5° C.

From the filtrate of (A), 19.5 g. starting material can be recovered by the addition of sodium hydroxide solution, vacuum-filtering, washing with water, and drying.

The following examples include pharmaceutical compositions of the novel compounds:

Example A.—Tablets

Each tablet contains:

| | Mg. |
|---|---|
| 1-(4-nitrophenyl)-2-methyl-4-nitro-imidazole | 800 |
| Lactose | 250 |
| Corn starch | 100 |
| Magnesium stearate | 20 |
| Finely dispersed silicic acid | 30 |

Example B.—Coated tablets

Each tablet contains:

| | Mg. |
|---|---|
| 1-(4-nitrophenyl)-2-methyl-4-nitro-imidazole | 250 |
| Lactose | 150 |
| Potato starch | 20 |
| Magnesium stearate | 20 |
| Finely dispersed silicic acid | 15 |

The coating (300 mg.) is a conventional mixture of corn starch, sugar, talc, and tragacanth.

Example C.—Syrup

A mixture of:

| | Kg. |
|---|---|
| 1-(4-nitrophenyl)-2-methyl-4-nitro-imidazole | 2.0 |
| Glycerol (twice distilled) | 7.5 |
| Cane sugar | 50.0 |
| Methyl-p-hydroxybenzoate | 0.07 |
| n-Propyl p-hydroxybenzoate | 0.03 |
| Ethanol | 15.0 |
| Fruit flavorings | As desired | is prepared and mixed with distilled water in such a manner that the volume of the entire preparation is 100 l. A dosage unit (5 ml.) contains 100 mg. of active substance.

Instead of 1-(4 - nitrophenyl) - 2 - methyl - 4 - nitroimidazole, other compounds covered by Formula I can be incorporated into similar compositions.

The preceding examples can be repeated with similar success by substituting the generically and specifically described reactants and operating conditions of this invention for those used in the preceding examples.

What is claimed is:

1. A compound of the formula:

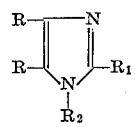

wherein:
$R_1$ is H or $CH_3$;
$R_2$ represents phenyl or pyridyl substituted by 1 or 2 nitro groups, and being optionally substituted by 1 or 2 lower alkyl groups; and one R represents nitro, and the other R represents hydrogen.

2. A compound as defined by claim 1 wherein the R representing nitro is in the 4-position.

3. A compound as defined by claim 1 wherein the R representing nitro is in the 5-position.

4. A compound as defined by claim 2 wherein $R_2$ represents

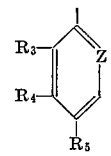

$R_3$ is H, $CH_3$, or $NO_2$;
$R_4$ is H or $CH_3$;
$R_5$ is H or $NO_2$; and
Z is CH or N,
with the provision that at least one of $R_3$ and $R_5$ is $NO_2$.

5. A compound as defined by claim 3 wherein $R_2$ represents

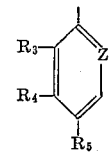

$R_3$ is H, $CH_3$, or $NO_2$;
$R_4$ is H or $CH_3$;
$R_5$ is H or $NO_2$; and
Z is CH or N,
with the provision that at least one of $R_3$ and $R_5$ is $NO_2$.

6. A compound as defined by claim 2 wherein $R_2$ represents p-nitrophenyl.

7. A compound as defined by claim 3 wherein $R_2$ represents p-nitrophenyl.

8. A compound as defined by claim 19 wherein $R_2$ represents 5-nitro-2-pyridyl.

9. A compound as defined by claim 3 wherein $R_2$ represents 5-nitro-2-pyridyl.

10. A compound as defined by claim 1 wherein said compound is 1-(4-nitrophenyl)-4-nitro-imidazole.

11. A compound as defined by claim 1 wherein said compound is 1-(4-nitrophenyl)-5-nitro-imidazole.

12. A compound as defined by claim 1 wherein said compound is 1-(4-nitrophenyl)-2-methyl-4-nitro-imidazole.

13. A compound as defined by claim 1 wherein said compound is 1-(4-nitrophenyl)-2-methyl-5-nitro-imidazole.

14. A compound as defined by claim 19 wherein said compound is 1-(5-nitro-2-pyridyl)-4-nitro-imidazole.

15. A compound as defined by claim 19 wherein said compound is 1-(5-nitro-2-pyridyl)-5-nitro-imidazole.

16. A compound as defined by claim 19 wherein said compound is 1-(5-nitro-2-pyridyl)-2-methyl-4-nitro-imidazole.

17. A compound as defined by claim 19 wherein said compound is 1-(5-nitro-2-pyridyl)-2-methyl-5-nitro-imidazole.

18. A compound as defined by claim 1 wherein $R_2$ represents phenyl substituted by 1 or 2 nitro groups and being optionally substituted by 1 or 2 lower alkyl groups.

19. A compound of the formula:

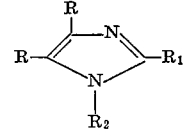

wherein:
  $R_1$ is H or $CH_3$;
  $R_2$ represents pyridyl substituted by 1 or 2 nitro groups, and being optionally substituted by 1 or 2 lower alkyl groups; and one R represents nitro, and the other R represents hydrogen.

References Cited

UNITED STATES PATENTS 3,065,133  11/1962  Tchetlitcheff _____ 167—53
3,255,201  6/1966  Beaman et al. _____ 260—309

OTHER REFERENCES

Sarett et al.: Chem. Abstracts, vol. 63, par. 18,097–18,098, 1965.
Samuels et al.: Chem. Abstracts, vol. 58, par. 4836, 1963.

HENRY R. JILES, Primary Examiner
A. L. ROTMAN, Assistant Examiner

U.S. Cl. X.R.
260—309; 424—263, 269